United States Patent
Sugawara (12) 
(10) Patent No.: US 6,208,646 B1
(45) Date of Patent: Mar. 27, 2001

(54) ATM TRANSFER SYSTEM OF DATA PACKETS

(75) Inventor: Tsugio Sugawara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/031,036

(22) Filed: Feb. 26, 1998

(30) Foreign Application Priority Data

Feb. 28, 1997 (JP) .................................................... 9-046571

(51) Int. Cl.[7] .............................. H04L 12/28; H04J 3/22
(52) U.S. Cl. ......................... 370/390; 370/395; 370/469
(58) Field of Search ................................... 370/469, 386, 370/389, 390, 392, 395, 396, 397

(56) References Cited

U.S. PATENT DOCUMENTS

| | | | | |
|---|---|---|---|---|
| 5,701,300 | * | 12/1997 | Jeon et al. | 370/395 |
| 5,907,536 | * | 8/1999 | Foglar | 370/395 |
| 5,940,393 | * | 8/1999 | Duree et al. | 370/392 |

FOREIGN PATENT DOCUMENTS

| | | |
|---|---|---|
| 827305 | 3/1998 | (EP) . |
| 4-349737 | 12/1992 | (JP) . |
| 9738550 | 10/1997 | (WO) . |
| 9818286 | 4/1998 | (WO) . |

OTHER PUBLICATIONS

"AMulticast Single–Queue Switch with a Vovel Copy Mechanism" by Hashemi et al. IEEE, pp. 800–807, Aug., 1998.*

International Search Report issued in connection with the corresponding PCT application (Aug. 19, 1998).

* cited by examiner

Primary Examiner—Alpus H. Hsu
Assistant Examiner—Afsar M. Qureshi
(74) Attorney, Agent, or Firm—Ostrolenk, Faber, Gerb & Soffen, LLP (57) ABSTRACT

To provide an ATM transfer system of data packets wherein transmission efficiency is improved by reducing useless occupation of the ATM network capacity; each of telephones (A and B) sends out a first and a second data packet destined to each of telephones (C and D), a network terminal (10) sends out an ATM cell multi-loaded with the first and the second data packet, the transmitter-side exchange (1) duplicates the ATM cell into a first and a second duplicated ATM cell, a receiver-side exchange (2) extracts only the first data packet and sends out a first new ATM cell loaded only with the first data packet while another receiver-side exchange (3) sends out a second new ATM cell loaded only with the second data packet in the same way, and each of network terminals (20 and 30) processes each of the first and the second new ATM cell into each of the first and second data packet to be sent to each of the telephones (C and D).

8 Claims, 6 Drawing Sheets

ATM TRANSFER SYSTEM OF DATA PACKETS

BACKGROUND OF THE INVENTION

The present invention relates to an ATM (Asynchronous Transfer Mode) transfer system of data packets for transferring low bit-rate and variable-length data packets such as voice packets making use of an ATM transfer network.

Conventionally, data packets such as voice packets are transferred on ATM cells by way of a VC (Virtual Channel) established between a packet transmitter and a packet receiver when the data packets are transmitted from a terminal to a terminal.

When data packets are to be transmitted from a terminal to a plurality of terminals for a broadcast communication, data packets are duplicated at an ATM layer. An example of the broadcast communication method is disclosed in a Japanese patent application laid open as a Provisional Publication No. 349737/'92, wherein each of ATM cells input to an ATM exchange is duplicated into N ATM cells when the data packets transmitted from a packet transmitter are to be transferred to N (N being an integer more than one) packet receivers regardless of data packets loaded on the ATM cells. By rewriting header information of every duplicated ATM cell with header information indicating each corresponding destination by the ATM exchange at the ATM layer, each of the plurality of ATM cells having the same data is output to be delivered to each of the plurality of packet receivers.

In conventional ATM transfer systems as above described, each one data packet is transmitted loaded on one ATM cell, using ATM circuits with low efficiency. It is because a part of the ATM cell is left useless occupying communication capacity of the ATM network in vain when a data packet such as a voice packet is loaded on the ATM cell having a fixed data length, since the low bit-rate and variable-length coding of the voice packet has been remarkably progressed along with progress of the voice data compression technique. Furthermore, this inefficiency accompanying the low bit-rate and variable-length coding of the voice packet is also duplicated in the above broadcast method wherein the same number of ATM cells to the number of destinations are all duplicated at the ATM layer.

For improving the transfer efficiency of the ATM network, multi-loading of the ATM cell is proposed recently, wherein data packets having different destinations, designated by AAL (ATM Adaptation Layer) header information added to each of the data packets, are multi-loaded on the same ATM cell, which is duplicated at a transmitter-side exchange to be sent out to different receiver-side exchanges. multi-loading refers to the process of multiplexing and packing the data packets on the ATM cell. thus improving efficiency by utilizing more of the communication channel.

However, when the multi-loaded ATM cell is duplicated at the ATM layer, in such a way as performed in the above broadcast method, according to fixed destinations registered when the call is established, there is still left certain inefficiency. This is because data packets such as voice packets may not be generated regularly, and ATM cells having no concerning data packet may be duplicated and transferred in vain to some receiver-side exchanges when data packets concerning to the receiver-side exchanges are not generated.

SUMMARY OF THE INVENTION

Therefore, a primary object of the present invention is to provide an ATM transfer system of data packets wherein transmission efficiency is improved by eliminating useless duplication of the ATM cells occupying the ATM network capacity in vain.

In order to achieve the object, in an ATM transfer system of data packets according to the invention having an ATM network including a transmitter-side exchange connected to a transmitter-side network terminal, and more than one receiver-side exchange:

the transmitter-side exchange comprises an AAL (ATM Adaptation Layer) processing circuit for generating duplicated ATM cells each to be sent to each of certain of said more than one receiver-side exchange by duplicating an original ATM cell transmitted from the transmitter-side network terminal when cell header information of the original ATM cell indicates that the original ATM cell is multi-loaded of data packets destined to different packet receivers, each of said certain of said more than one receiver-side exchange accommodating at least one of the different packet receivers designated by AAL header information accompanying each of the data packets;

one of said more than one receiver-side exchange connected to more than one receiver-side network terminal comprises another AAL processing circuit for generating new ATM cells each to be delivered to each of certain of said more than one receiver-side network terminal when a duplicated ATM cell arrives having cell header information indicating that the duplicated ATM cell is multi-loaded with data packets destined to different packet receivers, each of the new ATM cells being loaded with at least one of the data packets multi-loaded in the duplicated ATM cell, each of said at least one of the data packets being destined to at least one packet receiver designated by, AAL leader information accompanying said at least one of the data packets and connected to corresponding each of said certain of said more than one receiver-side network terminal; and one of said more than one receiver-side network terminal connected to more than one packet receiver accommodated in one of said more than one receiver-side exchanges comprises still another AAL processing circuit for generating data packets each to be sent to each of certain of said more than one packet receiver by duplicating a data packet loaded on a new ATM cell delivered from the receiver-side exchange when AAL header information accompanying the data packet indicates that the data packet is destined to said certain of said more than one packet receiver.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings, wherein voice packets are transferred by way of example of data packets.

Figure 1:
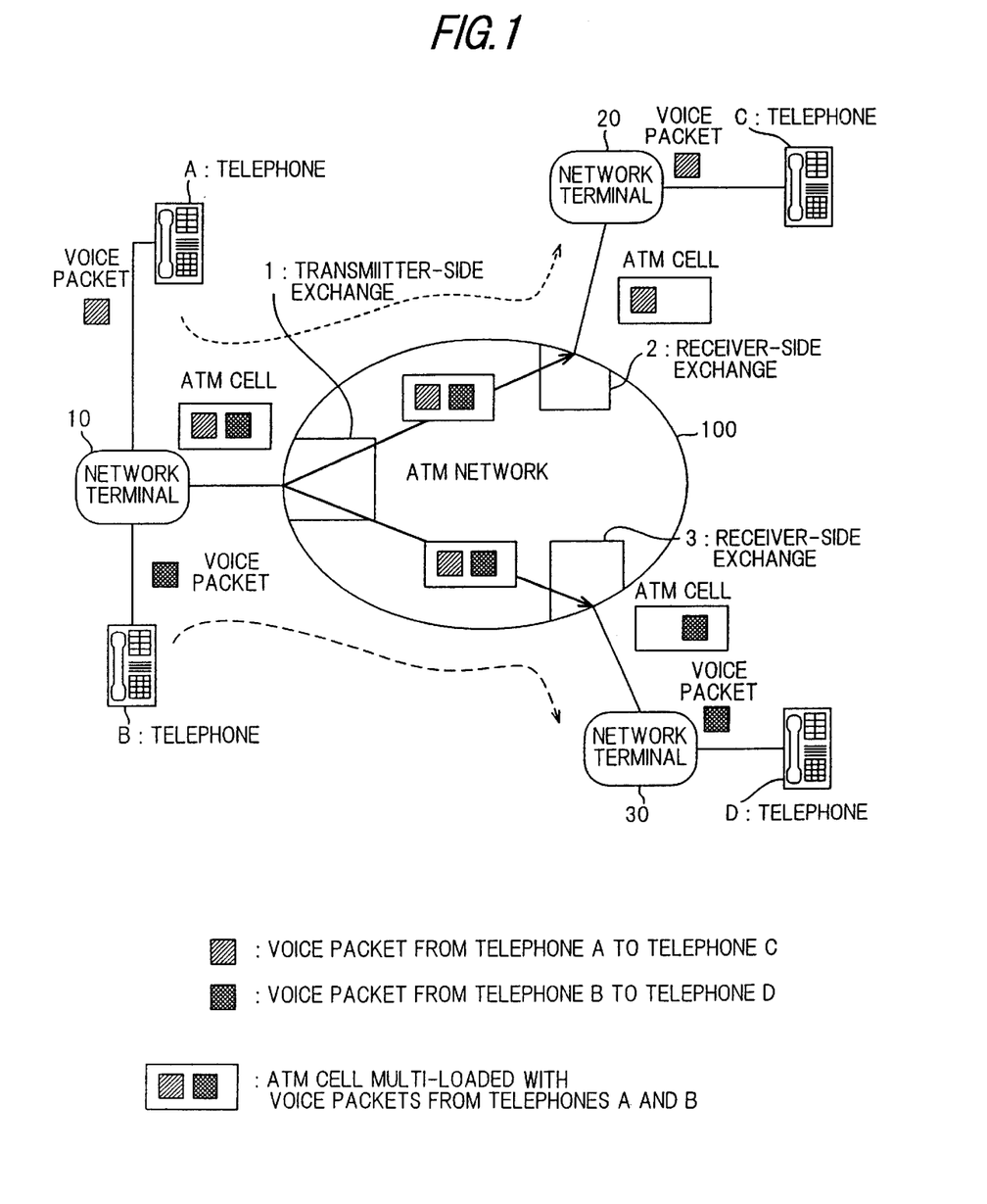
FIG. 1 is a network chart for illustrating basic operation of an ATM transfer system of data packets according a first embodiment of the invention.

FIG. 1 is a network chart for illustrating basic operation of an ATM transfer system of data packets according a first embodiment of the invention, wherein comprised a first and a second telephone A and B (each functioning as a packet transmitter), a transmitter-side network terminal 10 connected to the first and the second telephone A and B, an ATM network 100, a first and a second receiver-side network terminal 20 and 30, and a third and a fourth telephone C and D (each functioning as a packet receiver) connected to the first and the second receiver-side network terminal 20 and 30, respectively.

The ATM network 100 has a transmitter-side exchange 1 and a first and a second receiver-side exchange 2 and 3 connected to the transmitter-side exchange 1. The first and the second receiver-side exchange 2 and 3 are connected to the third and the fourth telephone C and D through the first and the second receiver-side network terminal 20 and 30, respectively, for accommodating them.

The first telephone A outputs a first data packet destined for the third telephone C, and the second telephone B outputs a second data packet destined for the fourth telephone D. The transmitter-side network terminal 10 generates an ATM cell whereon the first and the second data packet are multi-loaded to be transmitted to the transmitter-side exchange 1, adding AAL (ATM Adaptation Layer) header information to each of the first and the second data packet.

The transmitter-side exchange 1 duplicates the ATM cell transmitted from the transmitter-side network terminal 10 into the same number of ATM cells with the number of data packets multi-loaded on the ATM cell, that is, into a first and a second duplicated ATM cell in this case, and transmits the first and the second duplicated ATM cell to the first and the second receiver-side exchange 2 and 3, respectively. The first receiver-side exchange 2 extracts the first data packet, destined for the third telephone C accommodated in the first receiver-side exchange 2, from the data packets multi-loaded on the first duplicated cell, and generates a first new ATM cell to be transmitted to the first receiver-side network terminal 20 loaded only with the first data packet. In the same way, the second receiver-side exchange 3 extracts the second data packet, destined for the fourth telephone D accommodated in the second receiver-side exchange 3, from the data packets multi-loaded on the second duplicated cell, and generates a second new ATM cell to be transmitted to the second receiver-side network terminal 30 loaded only with the second data packet.

The first and the second receiver-side network terminal 20 and 30 extract the first and the second data packet from the first and the second new ATM cell, respectively, and deliver the first and the second data packet to the third and the fourth telephone C and D, respectively.

Figure 2:
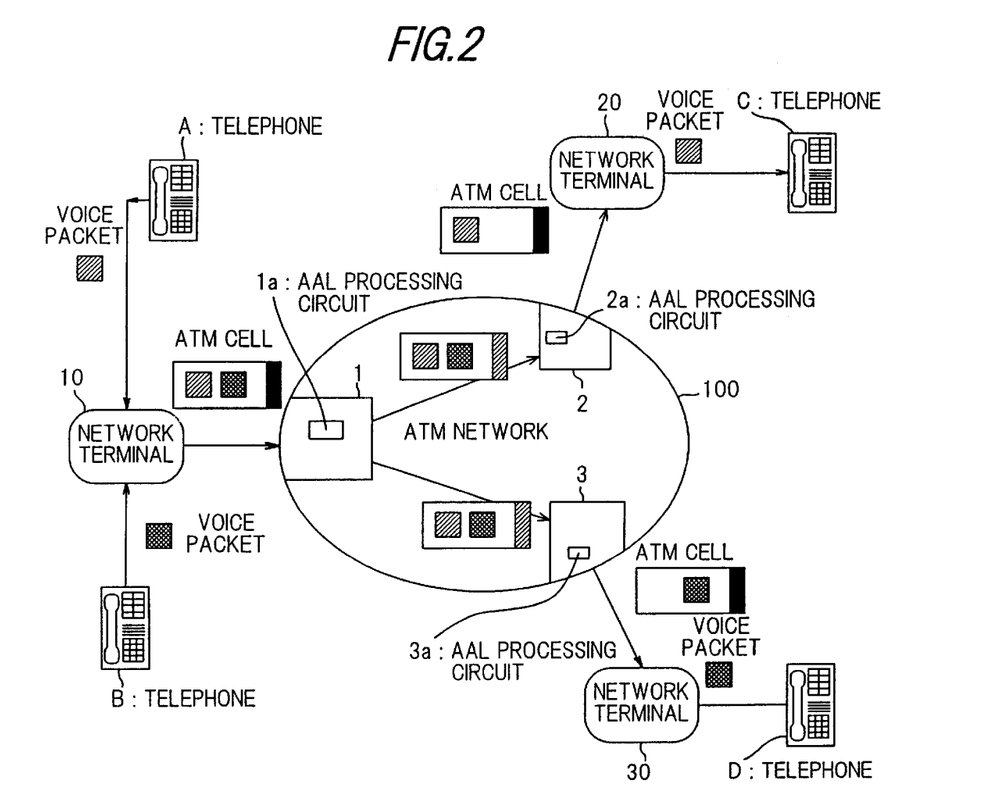
FIG. 2 is a block diagram illustrating an example of processes performed in the first embodiment of FIG. 1.

FIG. 2 is a block diagram illustrating an example of processes performed in the first embodiment of FIG. 1.

Referring to FIG. 2, the transmitter-side exchange 1 comprises an AAL (ATM Adaptation Layer) processing circuit 1a for duplicating the ATM cell received from the transmitter-side network terminal 10 into the first and the second duplicated ATM cell to be transmitted to the first and the second receiver-side exchange 2 and 3, respectively.

The first receiver-side exchange 2 comprises another AAL processing circuit 2a for extracting only the first data packet destined for the third telephone C accommodated in the first receiver-side exchange 2 from data packets multi-loaded on the first duplicated cell, and generating the first new ATM cell to be transmitted to the first receiver-side network terminal 20 loaded only with the first data packet. In the same way, the second receiver-side exchange 3 comprises still another AAL processing circuit 3a for extracting only the second data packet, destined for the fourth telephone D accommodated in the second receiver-side exchange 3, from the data packets multi-loaded on the second duplicated cell, and generating a second new ATM cell to be transmitted to the second receiver-side network terminal 30 loaded only with the second data packet.

Figure 3:
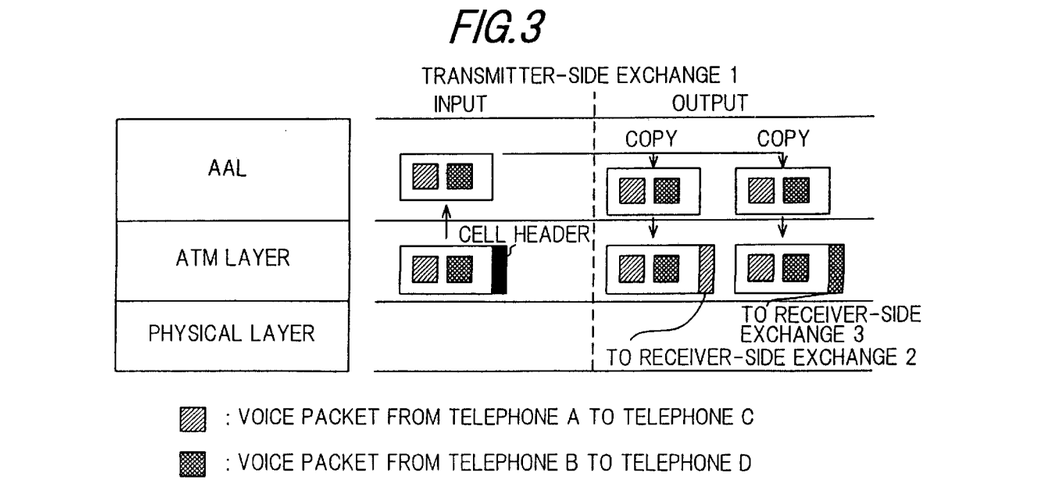
FIG. 3 is a schematic diagram illustrating processes performed at each layer in the transmitter-side exchange 1 of FIG. 2.

FIG. 3 is a schematic diagram illustrating processes performed at each layer in the transmitter-side exchange 1. Data packets transmitted from the first and the second telephone A and B is multi-loaded at the transmitter-side network terminal 10 on an ATM cell each added with AAL header information, which is received at an ATM layer by the transmitter-side exchange 1 of the ATM network 100. Each time when an ATM cell having ATM cell header information, which is registered when the call is established as indicating that the ATM cell is multi-loaded, is received, the AAL processing circuit 1a of the transmitter-side exchange 1 duplicates the received ATM cell into the same number of ATM cells with the number of data packets multi-loaded on the received ATM cell as shown in FIG. 3 referring the AAL header information accompanying each of the data packets at an ATM adaptation layer, and returns each of the duplicated ATM cells to the ATM layer to be transmitted through each of the ATM network circuits connected to the first and the second receiver-side exchange 2 and 3, respectively, changing destination of ATM cell header information thereof into each of the first and the second receiver-side exchange 2 and 3.

Figure 4:
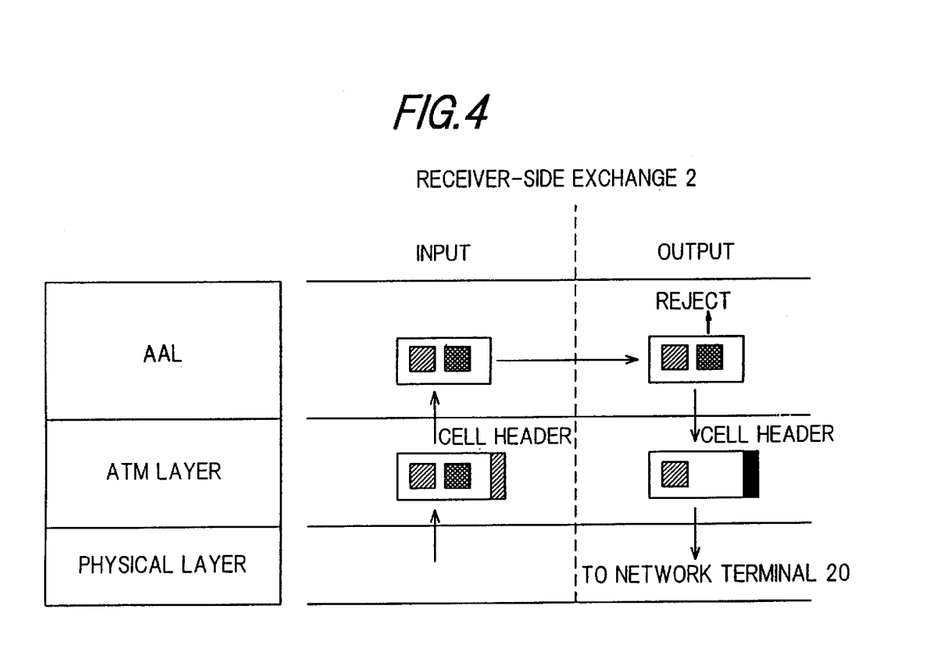
FIG. 4 is a schematic diagram illustrating processes performed at each layer in the first receiver-side exchange 2 of FIG. 2.
Figure 5:
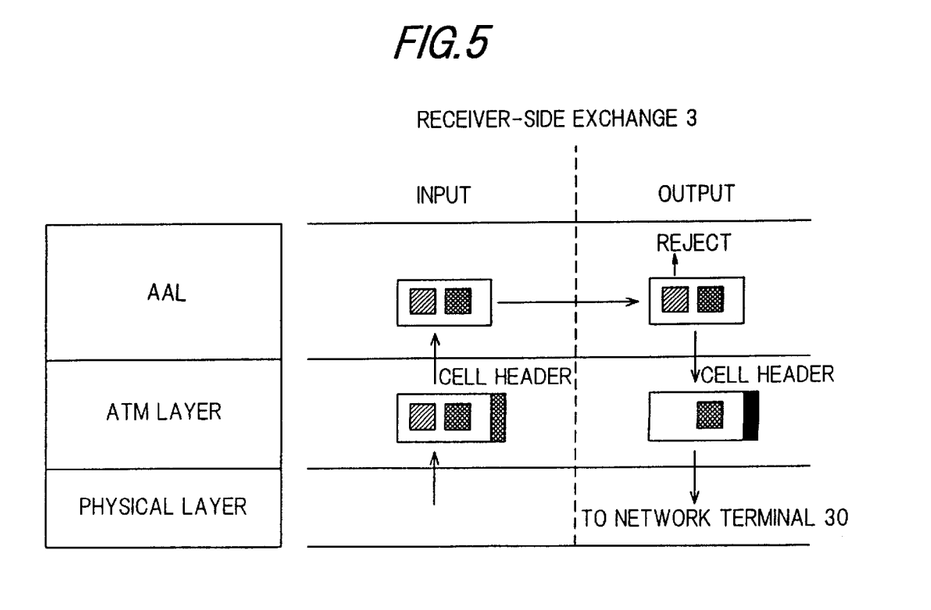
FIG. 5 is a schematic diagram illustrating processes performed at each layer in the second receiver-side exchange 3 of FIG. 2.

FIGS. 4 and 5 are schematic diagrams illustrating processes performed at each layer in the first and the second receiver-side exchange 2 and 3. When a duplicated ATM cell having ATM cell header information indicating that the duplicated ATM call is multi-loaded with more than one data packet is received at the ATM layer, the AAL processing circuit 2a of the first receiver-side exchange 2 extracts a data packet destined to a telephone, the third telephone C in the example, accommodated in the first receiver-side exchange 2 at the ATM adaptation layer referring to AAL header information of the data packet, rejecting other data packets as shown in FIG. 4. The extracted data packet is loaded on a new ATM cell to be output to the first receiver-side network terminal 20. In the same way, the AAL processing circuit 3a of the second receiver-side exchange 3 extracts a data packet destined to a telephone, the fourth telephone C in the example, accommodated in the second receiver-side exchange 3 at the AAL, when all ATM cell multi-loaded with more than one data packet is received at the ATM layer, rejecting other data packets as shown in FIG. 5. The extracted data packet is loaded on a new ATM cell to be output to the second receiver-side network terminal 30.

Figure 6:
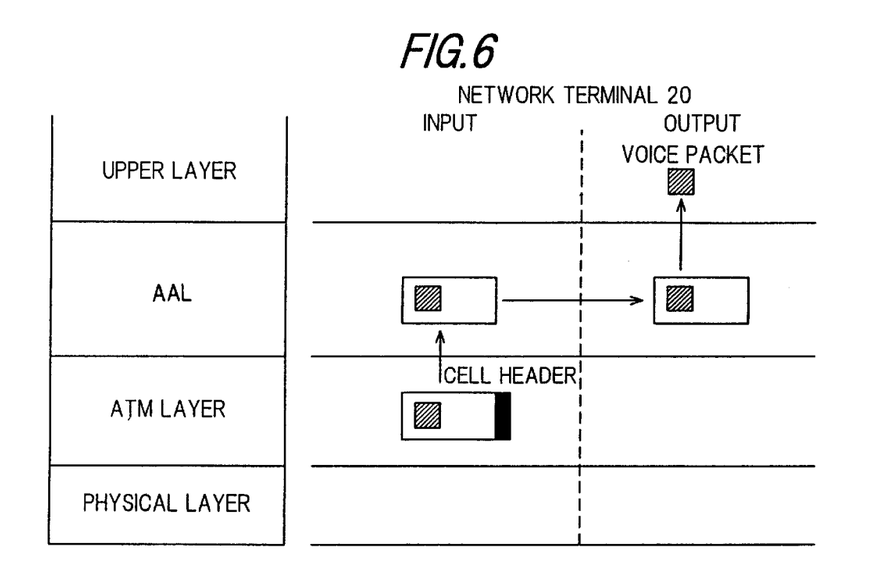
FIG. 6 is a schematic diagram illustrating processes performed at each layer in the second network terminal 20 of FIG. 2.
Figure 7:
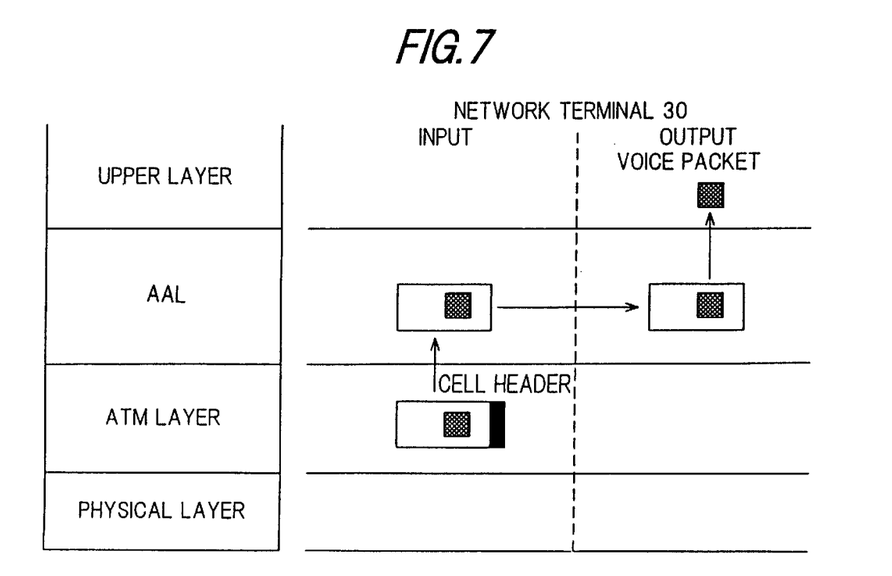
FIG. 7 is a schematic diagram illustrating processes performed at each layer in the third network terminal 30 of FIG. 2.

FIGS. 6 and 7 are schematic diagrams illustrating processes performed at each layer in the first and the second receiver-side network terminal 20 and 30.

The first receiver-side network terminal 20 extracts the data packet destined to the third telephone C from the new ATM cell arrived from the first receiver-side exchange 2 and sends out the data packet to the upper layer, that is, the third telephone C, according to AAL header information accompanying the data packet as shown in FIG. 6. In the same way, the second receiver-side network terminal 30 extracts the data packet destined to the fourth telephone D from the new ATM cell arrived from the second receiver-side exchange 3 and sends out the data packet to the upper layer, that is, the fourth telephone D, as shown in FIG. 7.

Heretofore, the first embodiment is described in connection with FIG. 2 wherein two packet transmitters A and B connected to the transmitter-side network terminal 10 transmit data packets to two packet receivers C and D each accommodated in each of two receiver-side exchanges 2 and 3. However, it is easily understood that the number of packet transmitters connected to the transmitter-side network terminal 10, and consequently, the number of packet receivers or concerning receiver-side exchanges may be any, on condition that data packets from the packet transmitter can be multi-loaded on an ATM cell.

Further, unnecessary data packets are described to be rejected in the first and the second receiver-side exchange 2 and 3. However, they may be rejected at the first and the second receiver-side network terminal 20 and 30, the first and the second receiver-side exchange 2 and 3 generating necessary new ATM cells by copying the duplicated ATM cell having the same number of data packets.

Thus, by duplicating ATM cells at the ATM adaptation layer referring to AAL header information, unnecessary duplication can be prevented in the embodiment, improving transmission efficiency of the ATM network 100 especially when low bit-rate and variable-length data packets such as voice packets are transferred.

In the first embodiment of FIG. 2, one data packet is described to be destined to one packet receiver C or D. However, one data packet may be destined to more than one packet receiver.

Figure 8:
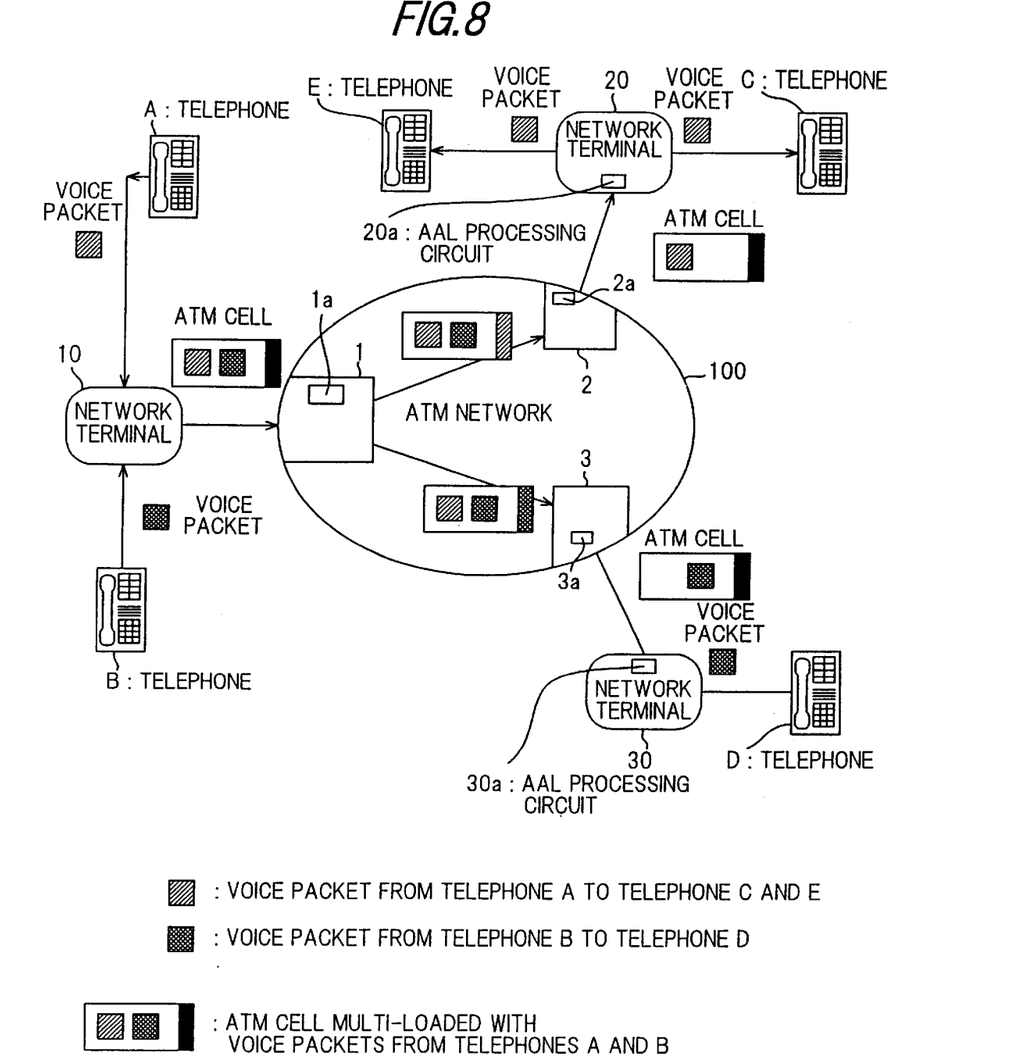
FIG. 8 is a block diagram illustrating a second embodiment of the invention.

FIG. 8 is a block diagram illustrating a second embodiment of the invention. Compared to the first embodiment of FIG. 1, AAL processing circuits 20a and 30a are provided also in the first and the second receiver-side network terminal 20 and 30, respectively, a fifth telephone E (also functioning as a packet receiver) is further connected to the first receiver-side network terminal 20, in this example, to be accommodated in the first receiver-side exchange 2 together with the third telephone C, and the first telephone A transmits data packets destined to both the third and the fifth telephone C and E.

Now, an example of processes performed according to the second embodiment is described referring to FIG. 8.

In the case, the AAL processing circuit 2a of the first receiver-side exchange 2 extracts only the first data packet destined to the third and the fifth telephone C and E, which are both accommodated in the first receiver-side exchange 2, when an ATM cell multi-loaded with the first and the second data packets is received from the transmitter-side exchange 1, and sends a new ATM loaded with the first data packet to the first receiver-side network terminal 20, in the same way with the first embodiment of FIG. 1.

Figure 9:
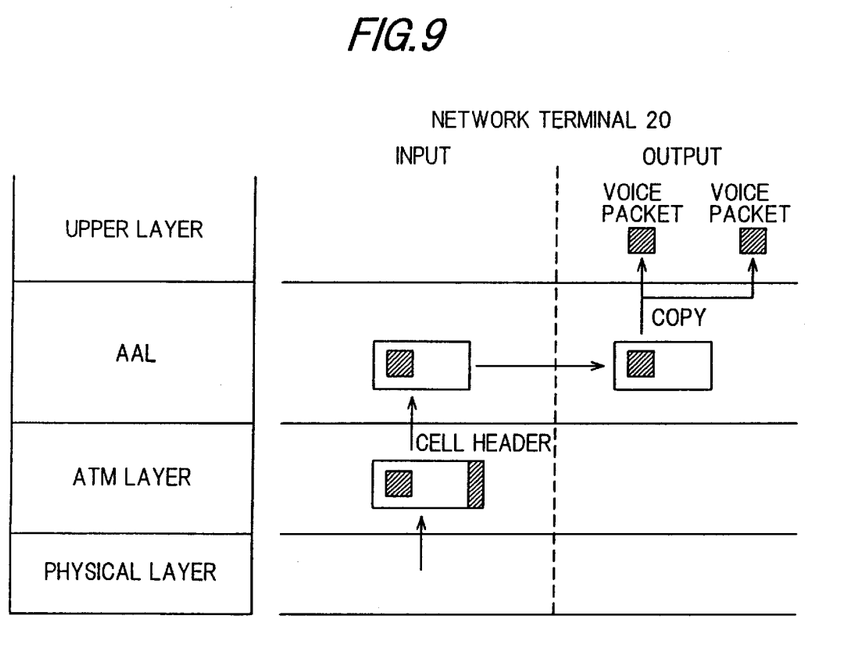
FIG. 9 is a schematic diagram illustrating processes performed at each layer in the second network terminal 20 of FIG. 8.

FIG. 9 is a schematic diagram illustrating processes performed at each layer in the first receiver-side network terminal 20. The first receiver-side network terminal 20 processes the new ATM cell delivered from the first receiver-side exchange 2 into the first data packet, and duplicates the first data packet into the same number of data packets with the number of telephones to which the first data packet is destined, that is, the third and the fifth telephone C and E referring to AAL header of the first data packet at the ATM adaptation layer, each of which is sent out to the upper layer, namely, to respective each of the third and the fifth telephone C and E. The AAL processing circuit 20a is provided for taking charge of these processes.

As to the second data packet, it is extracted by the AAL processing circuit 3a of the second receiver-side exchange 3 from the ATM cell multi-loaded with the first and the second data packet and delivered to the second receiver-side network terminal 30 loaded on a new ATM cell. In the network terminal 30, the AAL processing circuit 30a processes the new ATM cell into the second data packet, which is sent to the fourth telephone D, in a similar way with the example of FIG. 2.

In the example of FIG. 8, the first data packet is described to be destined to two packet receivers C and E connected to the same receiver-side network terminal 20. However, it is easily understood that the number of destinations of the first data packet, and consequently, the number of concerning receiver-side network terminals or concerning receiver-side exchanges may be any, by duplicating necessary number of ATM cells at the receiver-side exchange 20 when destinations of the first data packet concerns to more than one receiver-side network terminal or at the transmitter-side exchange 10 when the destinations of the first data packet concerns to more than one receiver-side exchanges, referring to AAL header information accompanying the first data packet.

As heretofore described, in the ATM transfer system of data packets of the invention, transmission efficiency can be improved by reducing useless occupation of the ATM network capacity, by duplicating the ATM cells at the ATM adaptation layer according to the number of destination of data packets multi-loaded therein, or duplicating the data packets at the ATM adaptation layer according to the number of destination.

What is claimed is:

1. An ATM (Asynchronous Transfer Mode) transfer system of data packets having an ATM network including a transmitter-side exchange connected to a transmitter-side network terminal, and more than one receiver-side exchange:

said transmitter-side exchange comprising an AAL (ATM Adaptation Layer) processing circuit for generating duplicated ATM cells each to be sent to each of certain of said more than one receiver-side exchange by duplicating an original ATM cell transmitted from the transmitter-side network terminal when cell header information of the original ATM cell indicates that the original ATM cell is multi-loaded of data packets destined to different packet receivers, each of said certain of said more than one receiver-side exchange accommodating at least one of the different packet receivers designated by, AAL header infor mation accompanying each of the data packets.

2. An ATM transfer system of data packets having an ATM network including a receiver-side exchange connected to more than one receiver-side network terminal:

said receiver-side exchange comprising an AAL processing circuit for generating new ATM cells each to be delivered to each of certain of said more than one receiver-side network terminal when a duplicated ATM cell arrives having cell header information indicating that the duplicated ATM cell is multi-loaded with data packets destined to different packet receivers, each of the new ATM cells being loaded with at least one of the data packets multi-loaded in the duplicated ATM cell, each of said at least one of the data packets being destined to at least one packet receiver designated by AAL header information accompanying said at least one of the data packets and connected to corresponding each of said certain of said more than one receiver-side network terminal.

3. An ATM transfer system of data packets having an ATM network including a receiver-network terminal connected to more than one packet receiver accommodated in a receiver-side exchange of the ATM network:

said receiver-side network terminal comprising an AAL processing circuit for generating data packets each to be sent to each of certain of said more than one packet receiver by duplicating a data packet loaded on a new ATM cell delivered from the receiver-side exchange when AAL header information accompanying the data packet indicates that the data packet is destined to said certain of said more than one packet receiver.

4. An ATM (Asynchronous Transfer Mode) transfer system of data packets comprising an ATM network having a transmitter-side exchange and a first and a second receiver-side exchange, a transmitter-side network terminal connected to the transmitter-side exchange, a first and a second receiver-side network terminal connected to the first and the second receiver-side exchange, respectively, a first and a second packet transmitter connected to the transmitter-side network terminal, and a first and a second packet receiver connected to the first and the second receiver-side network terminal, respectively; wherein:

the first packet transmitter sends out a first data packet destined to the first packet receiver;

the second packet transmitter sends out a second data packet destined to the second packet receiver;

the transmitter-side network terminal sends out an original ATM cell to the transmitter-side exchange, said original ATM cell being multi-loaded with the first and the second data packet;

the transmitter-side exchange duplicates the original ATM cell into the same number of duplicated ATM cells with a number of data packets multi-loaded on the original ATM cell, a first and a second duplicated ATM cell of the duplicated ATM cells being sent out to the first and the second receiver-side exchange, respectively, each accommodating each of the first and the second packet receiver whereto respective each of the first and the second data packet is destined;

the first receiver-side exchange extracts only the first data packet destined to the first packet receiver accommodated in the first receiver-side exchange from the first and the second data packet multi-loaded on the first duplicated ATM cell, and sends out a first new ATM cell loaded only with the first data packet to the first receiver-side network terminal connected to the first packet receiver whereto the first data packet is destined;

the second receiver-side exchange extracts only the second data packet destined to the second packet receiver accommodated in the second receiver-side exchange from the first and the second data packet multi-loaded on the second duplicated ATM cell, and sends out a second new ATM cell loaded only with the second data packet to the second receiver-side network terminal connected to the second packet receiver whereto the second data packet is destined;

the first receiver-side network terminal processes the first new ATM cell into the first data packet, and sends the first data packet to the first packet receiver whereto the first data packet is destined; and the second receiver-side network terminal processes the second new ATM cell into the second data packet, and sends the second data packet to the second packet receiver whereto the second data packet is destined.

5. The ATM transfer system of data packets recited in claim 4, wherein:

the transmitter-side exchange comprises a transmitter-side AAL (ATM Adaptation Layer) processing circuit for duplicating the original ATM cell into the first and the second duplicated ATM cell to be sent out to the first and the second receiver-side exchange, respectively;

the first receiver-side exchange comprises a first receiver-side AAL processing circuit for extracting only the first data packet destined to the first packet receiver accommodated in the first receiver-side exchange from the first and the second data packet multi-loaded on the first duplicated ATM cell, and sending out the first new ATM cell loaded only with the first data packet to the first receiver-side network terminal; and the second receiver-side exchange comprises a second receiver-side AAL processing circuit for extracting only the second data packet destined to the second packet receiver accommodated in the second receiver-side exchange from the first and the second data packet multi-loaded on the second duplicated ATM cell, and sending out the second new ATM cell loaded only with the second data packet to the second receiver-side network terminal.

6. An ATM (Asynchronous Transfer Mode) transfer system of data packets comprising an ATM network having a transmitter-side exchange and a first and a second receiver-side exchange, a transmitter-side network terminal connected to the transmitter-side exchange, a first and a second receiver-side network terminal connected to the first and the second receiver-side exchange, respectively, a first and a second packet transmitter connected to the transmitter-side network terminal, a first and a third packet receiver connected to the first receiver-side network terminal, and a second packet receiver connected to the second receiver-side network terminal; wherein:

the first packet transmitter sends out a first data packet destined to the first and the third packet receiver;

the second packet transmitter sends out a second data packet destined to the second packet receiver;

the transmitter-side network terminal sends out an original ATM cell to the transmitter-side exchange, said original ATM cell being multi-loaded with the first and the second data packet;

the transmitter-side exchange duplicates the original ATM cell into the same number of duplicated ATM cells with a number of data packets multi-loaded on the original ATM cell, a first and a second duplicated ATM cell of the duplicated ATM cells being sent out to the first and the second receiver-side exchange, respectively, said first receiver-side exchange accommodating the first and the third packet receiver whereto the first data packet is destined, and said second receiver-side exchange accommodating the second packet receiver whereto the second data packet is destined;

the first receiver-side exchange extracts only the first data packet destined to the first and the third packet receiver accommodated in the first receiver-side exchange from the first and the second data packet multi-loaded on the first duplicated ATM cell, and sends out a first new ATM cell loaded only with the first data packet to the first receiver-side network terminal connected to the first and the second packet receiver whereto the first data packet is destined;

the second receiver-side exchange extracts only the second data packet destined to the second packet receiver accommodated in the second receiver-side exchange from the first and the second data packet multi-loaded on the second duplicated ATM cell, and sends out a second new ATM cell loaded only with the second data packet to the second receiver-side network terminal connected to the second packet receiver whereto the second data packet is destined;

the first receiver-side network terminal processes the first new ATM cell into the first data packet, duplicates the first data packet into the same number of duplicated data packets with a number of packet receivers whereto the first data packet is destined, and sends each of the duplicated data packets to each of the first and the third packet receiver whereto the first data packet is destined; and the second receiver-side network terminal processes the second new ATM cell into the second data packet, and sends the second data packet to the second packet receiver whereto the second data packet is destined.

7. The ATM transfer system of data packets recited in claim 6, wherein:

the transmitter-side exchange comprises a transmitter-side AAL (ATM Adaptation Layer) processing circuit for duplicating the original ATM cell into the first and the second duplicated ATM cell to be sent out to the first and the second receiver-side exchange, respectively;

the first receiver-side exchange comprises a first receiver-side AAL processing circuit for extracting only the first data packet destined to the first and the third packet receiver accommodated in the first receiver-side exchange from the first and the second data packet multi-loaded on the first duplicated ATM cell, and sending out- the first new ATM cell loaded only with the first data packet to the first receiver-side network terminal; and the second receiver-side exchange comprises a second receiver-side AAL processing circuit for extracting only the second data packet destined to the second packet receiver accommodated in the second receiver-side exchange from the first and the second data packet multi-loaded on the second duplicated ATM cell, and sending out the second new ATM cell loaded only with the second data packet to the second receiver-side network terminal.

8. The ATM transfer system of data packets recited in claim 6, wherein:

the first receiver-side network terminal comprises a network terminal AAL processing circuit for processing the first new ATM cell into the first data packet, duplicating the first data packets into the duplicated data packets, and sending the duplicated data packets to the first and the third packet receiver.

* * * * *